(12) United States Patent
Titz

(10) Patent No.: US 8,479,449 B2
(45) Date of Patent: Jul. 9, 2013

(54) SEALING, TRIMMING AND GUIDING STRIP

(75) Inventor: Peter Titz, Monchengladbach (DE)

(73) Assignee: Henniges Automotive Sealing Systems North America, Inc., Farmington, MI (US)

(*) Notice: Subject to any disclaimer, the term of this patent is extended or adjusted under 35 U.S.C. 154(b) by 894 days.

(21) Appl. No.: 10/530,325

(22) PCT Filed: Oct. 3, 2003

(86) PCT No.: PCT/IB03/04353
§ 371 (c)(1),
(2), (4) Date: Oct. 19, 2006

(87) PCT Pub. No.: WO2004/030965
PCT Pub. Date: Apr. 15, 2004

(65) Prior Publication Data
US 2007/0101656 A1 May 10, 2007

(30) Foreign Application Priority Data

Oct. 2, 2002 (GB) .................... 0222817.9
Mar. 10, 2003 (GB) .................... 0305476.4

(51) Int. Cl.
*E05D 15/16* (2006.01)
(52) U.S. Cl.
USPC ............. 49/440; 49/441; 49/490.1; 49/479.1
(58) Field of Classification Search
USPC ............... 49/495.1, 490.1, 479.1, 475.1, 440, 49/441
See application file for complete search history.

(56) References Cited

U.S. PATENT DOCUMENTS

| 4,591,203 | A | * | 5/1986 | Furman .................. 296/201 |
| 4,614,061 | A | * | 9/1986 | Brocke ..................... 49/440 |
| 4,625,459 | A | | 12/1986 | Warner |
| 4,653,230 | A | * | 3/1987 | Seo et al. ................. 49/502 |
| 4,894,954 | A | | 1/1990 | Nozaki et al. |
| 4,908,989 | A | | 3/1990 | Omura et al. |
| 5,035,937 | A | | 7/1991 | Nozaki |

(Continued)

FOREIGN PATENT DOCUMENTS

| DE | 31 26 491 A1 | 1/1983 |
| DE | 33 36 733 A1 | 4/1985 |

(Continued)

OTHER PUBLICATIONS

Notice of Opposition against European Patent No. EP 1 545 920 by Metzeler Automotive Profile Systems GmbH dated Jan. 9, 2009, 157 pages.

(Continued)

*Primary Examiner* — Gregory J. Strimbu
(74) *Attorney, Agent, or Firm* — Howard & Howard Attorneys PLLC

(57) ABSTRACT

A sealing, trimming or guiding strip (15) for windows of a motor vehicle comprises a loop formed around the fixed quarter light (11) of the vehicle and a further loop formed around the sliding main window (9) of the rear door of the vehicle. This strip comprises an extruded part (19) extending along both loops to provide a pleasing continuous appearance for the exterior of the vehicle. A portion of the extruded material (19) is cut away and replaced by molded material molded onto the extruded part (19) for the portion of the strip into which the quarter light (11) is mounted.

36 Claims, 10 Drawing Sheets

U.S. PATENT DOCUMENTS

| | | | |
|---|---|---|---|
| 5,038,521 A * | 8/1991 | Andrzejewski et al. | 49/441 |
| 5,127,193 A | 7/1992 | Okada et al. | |
| 5,209,019 A * | 5/1993 | Morita | 49/490.1 |
| 5,269,101 A * | 12/1993 | Nozaki et al. | 49/479.1 |
| 5,317,835 A * | 6/1994 | Dupuy et al. | 49/441 |
| 5,369,914 A * | 12/1994 | Takeuchi | 49/495.1 |
| 5,433,038 A * | 7/1995 | Dupuy | 49/377 |
| 5,493,814 A * | 2/1996 | Christian | 49/479.1 |
| 5,557,890 A * | 9/1996 | Levy et al. | 49/502 |
| 5,743,047 A * | 4/1998 | Bonne et al. | 49/490.1 |
| 5,779,956 A | 7/1998 | Hollingshead et al. | |
| 5,820,198 A | 10/1998 | Nozaki | |
| 5,918,421 A * | 7/1999 | Nozaki | 49/492.1 |
| 5,972,268 A | 10/1999 | Nakajima et al. | |
| 5,976,438 A | 11/1999 | Hamabata | |
| 6,012,760 A | 1/2000 | Nozaki | |
| 6,023,888 A * | 2/2000 | Dover | 49/441 |
| 6,082,048 A * | 7/2000 | Backes et al. | 49/377 |
| 6,250,017 B1 | 6/2001 | Tessier | |
| 6,370,824 B1 * | 4/2002 | Keeney et al. | 49/441 |
| 6,395,355 B1 | 5/2002 | Nakajima et al. | |
| 6,397,525 B1 * | 6/2002 | Ishibashi et al. | 49/484.1 |
| 6,493,992 B2 * | 12/2002 | Goto | 49/441 |
| 6,598,348 B2 * | 7/2003 | Palicki | 49/479.1 |
| 6,601,345 B2 * | 8/2003 | Nozaki et al. | 49/483.1 |
| 6,817,651 B2 * | 11/2004 | Carvalho et al. | 296/146.2 |
| 6,966,601 B2 * | 11/2005 | Matsumoto et al. | 296/146.2 |
| 7,010,886 B2 * | 3/2006 | Deguchi et al. | 49/479.1 |
| 2002/0062596 A1 * | 5/2002 | Palicki | 49/441 |
| 2004/0111973 A1 * | 6/2004 | Moisy et al. | 49/490.1 |
| 2005/0120634 A1 * | 6/2005 | Drivon et al. | 49/475.1 |

FOREIGN PATENT DOCUMENTS

| | | |
|---|---|---|
| DE | 196 32 843 C1 | 9/1997 |
| DE | 101 59 251 C1 | 4/2003 |
| EP | 0 279 998 A1 | 8/1988 |
| EP | 0 380 398 A1 | 8/1990 |
| EP | 0 386 513 B1 | 9/1990 |
| EP | 0 581 389 A1 | 2/1994 |
| EP | 1036910 A2 | 9/2000 |
| EP | 0895494 B1 | 7/2001 |
| EP | 1316456 A2 | 6/2003 |
| FR | 2 689 441 A1 | 10/1993 |
| FR | 2 696 376 A1 | 4/1994 |
| FR | 2 731 765 A1 | 9/1996 |
| GB | 2 140 068 A | 11/1984 |
| GB | 2 237 768 A | 5/1991 |
| GB | 2 302 558 A | 1/1997 |
| GB | 2 312 460 A | 10/1997 |
| GB | 2 361 020 A | 10/2001 |
| JP | 6076420 A | 4/1985 |
| JP | 6-278461 | 10/1994 |
| JP | 8-72539 | 3/1996 |
| JP | 10-129263 | 5/1998 |
| JP | 2000-203270 | 7/2000 |
| JP | 2001-322437 | 11/2001 |
| WO | WO 97/47456 | 12/1997 |

OTHER PUBLICATIONS

English Translation of pp. 2-7 and pp. 138-153 of the Notice of Opposition against European Patent No. EP 1 545 920 by Metzeler Automotive Profile Systems GmbH dated Jan. 9, 2009, 17 pages.

Response to the Notice of Opposition against European Patent No. EP 1 545 920, submitted Sep. 4, 2009, 28 pages.

Volkswagen AG drawings from Oct. 17, 2001 cited in the Notice of Opposition against European Patent No. EP 1 545 920 by Metzeler Automotive Profile Systems GmbH dated Jan. 9, 2009, 3 pages.

International Search Report for International Application No. PCT/IB03/04353, dated Jan. 22, 2004, 3 pages.

Printing of website http:/de.wikipedia.org/wiki/VW_Touran from Jan. 4, 2009 cited in the Jan. 9, 2009 Notice of Opposition against European Patent No. EP 1 545 920 by Metzeler Automotive Profile Systems GmbH, 2 pages.

English translation of communication by the Opponent in the Opposition Proceeding against European Patent No. EP 1 545 920, submitted by Metzeler Automotive Profile Systems GmbH on Jun. 17, 2010, 9 pages.

* cited by examiner

SEALING, TRIMMING AND GUIDING STRIP

FIELD OF THE INVENTION

The invention relates to sealing, trimming or guiding strips. Strips embodying the invention, to be described in more detail below by way of example only, are for use in sealing, trimming and guiding window glass in motor vehicle body construction.

BRIEF SUMMARY OF THE INVENTION

According to the invention, there is provided a sealing, trimming or guiding strip for a window frame, comprising a length of extruded material extending along and forming part of the strip, a portion of the extruded material along part only of the length thereof having been removed and replaced with moulded material which is moulded onto and thereby connected to the extruded material.

According to the invention, there is further provided a method of forming a sealing, trimming or guiding strip for a window frame, comprising extruding a length of material to form part of the strip, removing a portion of the extruded material along part only of the length thereof, and replacing the said portion with moulded material which is moulded onto and thereby connected to the extruded material.

BRIEF DESCRIPTION OF THE DRAWINGS

Sealing, trimming or guiding strips for vehicles and embodying the invention will now be described, by way of example only, with reference to the accompanying diagrammatic drawings in which.

In general, in the drawings, like elements are designated with the same reference numeral

DETAILED DESCRIPTION OF EMBODIMENTS OF THE INVENTION

Figure 1:
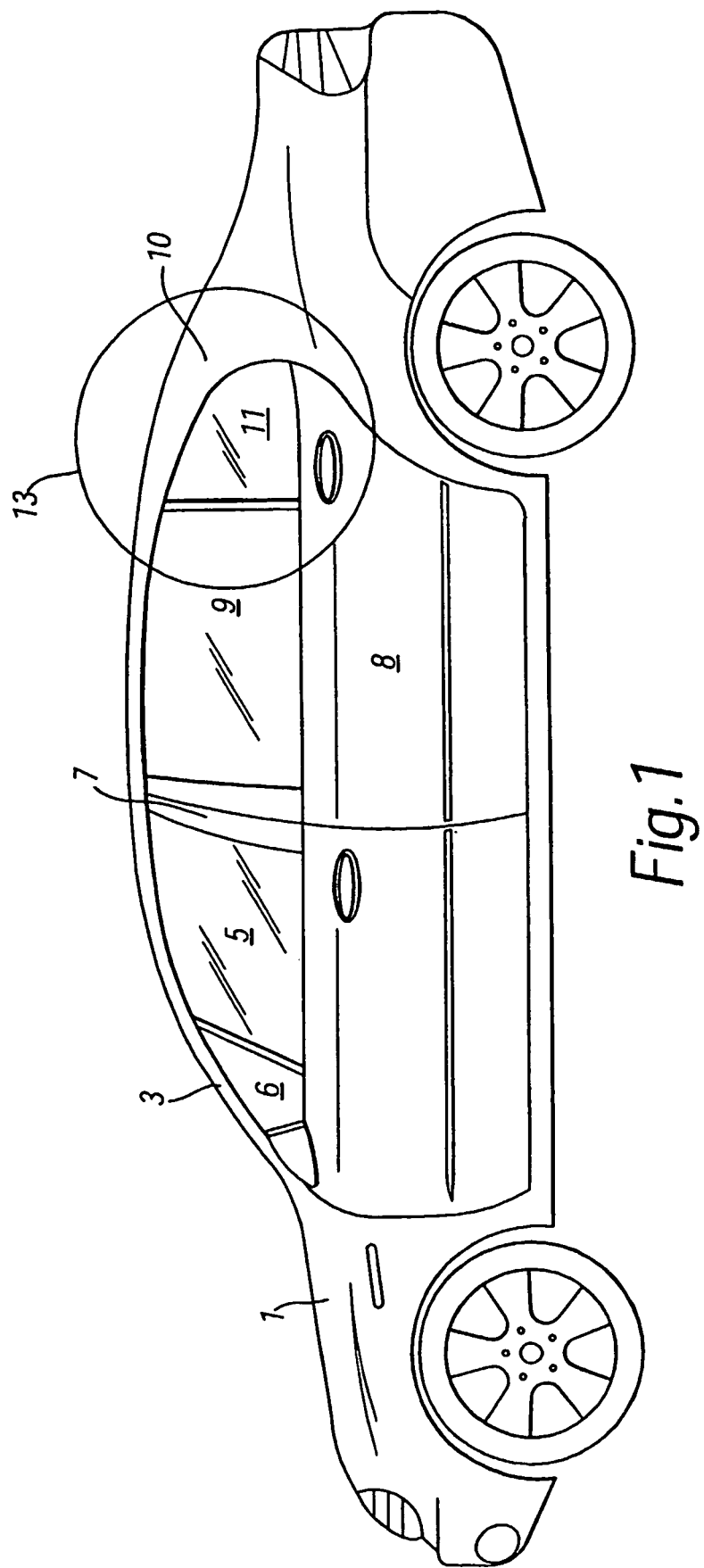
FIG. 1 is a side view of a motor vehicle with the rear quarter light encircled.

The side elevation of the motor vehicle 1 of FIG. 1 shows the vehicle's A-pillar 3 where the front side window 5 (or front quarter light window 6, if provided) runs adjacent to the vehicle windscreen (not shown). The B-pillar 7 lies between the front side window 5 and the main rear side window 9. It is typical for vehicles having rear doors 8 to include, in addition to the main window 9 (which will normally have a glass pane which may be raised and lowered), a smaller quarter light window 11. The quarter light window 11 generally has a fixed glass pane. The vehicle C-pillar 10 runs down the rear side of the frame of the opening for the door 8.

The present invention is primarily concerned with the structure and fabrication of a sealing, trimming or guiding strip for the frame of the rear main window 9 and quarter light 11, and is particularly concerned with the structure of such a strip in the encircled region 13 of FIG. 1.

Figure 2:
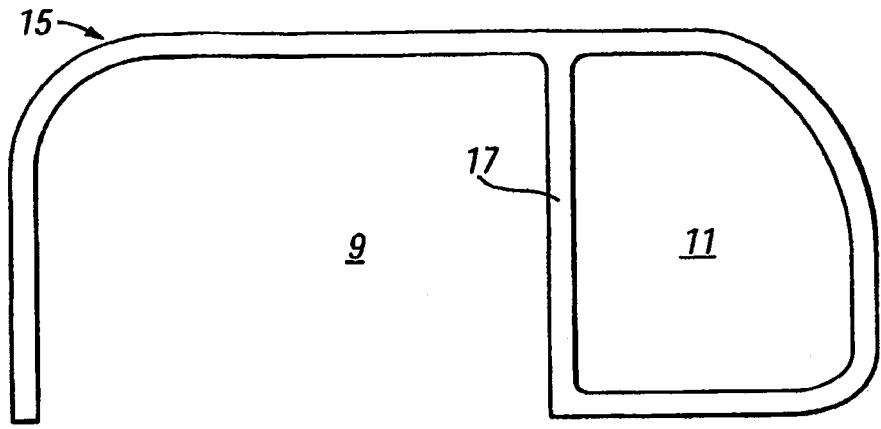
FIG. 2 shows a side view of one of the strips.

FIG. 2 shows a sealing, trimming or guiding strip for mounting in the flame of main window 9 and quarter light 11. The strip, indicated generally at 15, includes a loop portion extending around the quarter light 11 and a portion extending along the top and sides of the main window 9, having a cross-piece 17 common to both portions.

Figure 3:
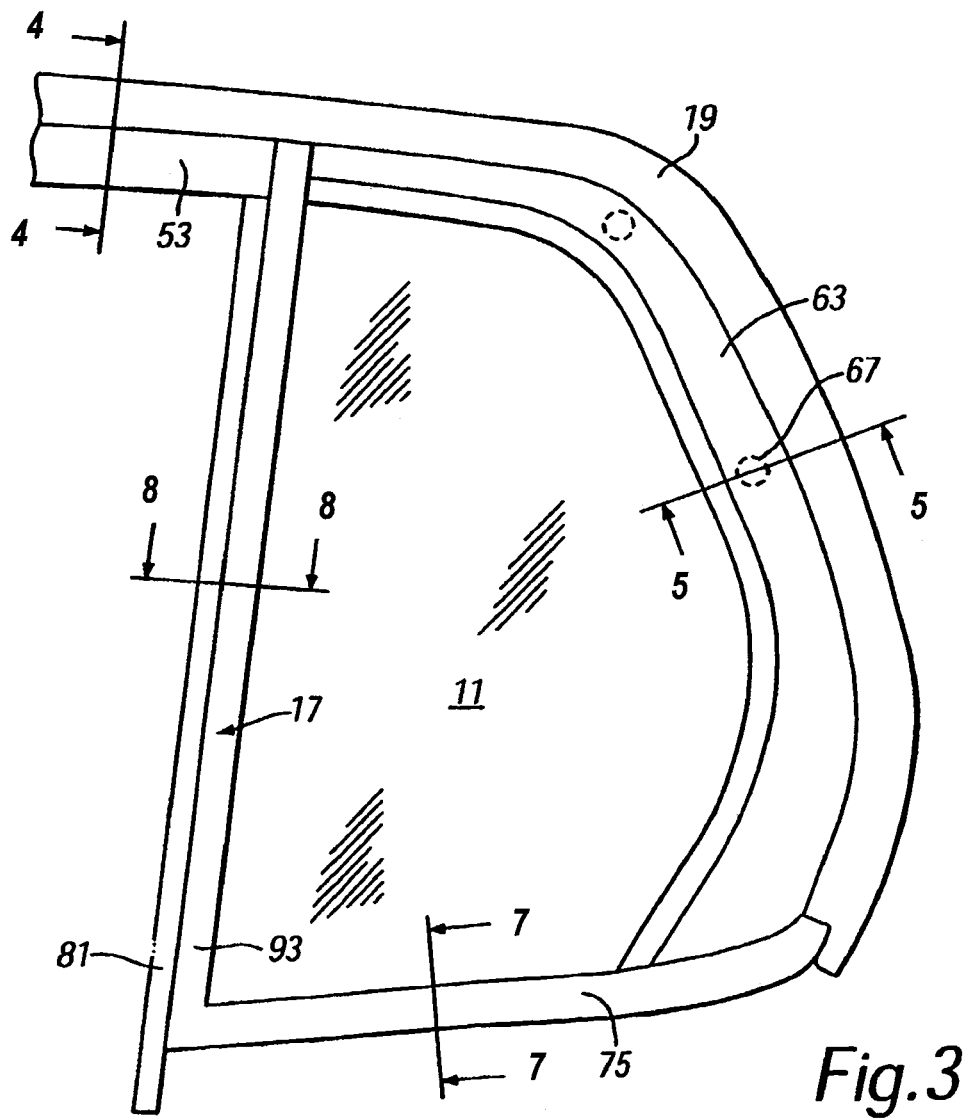
FIG. 3 shows an enlarged side view of part of the strip of FIG. 2 in the region of the rear quarter light of the motor vehicle of FIG. 1.

FIG. 3 shows in greater detail the strip 15 in the encircled region 13 of FIG. 1. The strip 15 has a continuously extruded part 19 that extends continuously along the top of the main window 9 and around the top and rear side of the quarter light 11. The continuously extruded part 19 gives a pleasing external visual appearance with no joins. The construction of the strip 15 in the region 13 will be further understood from the following detailed description of the cross sections 4-4, 5-5, 6-6, and 7-7.

Figure 4:
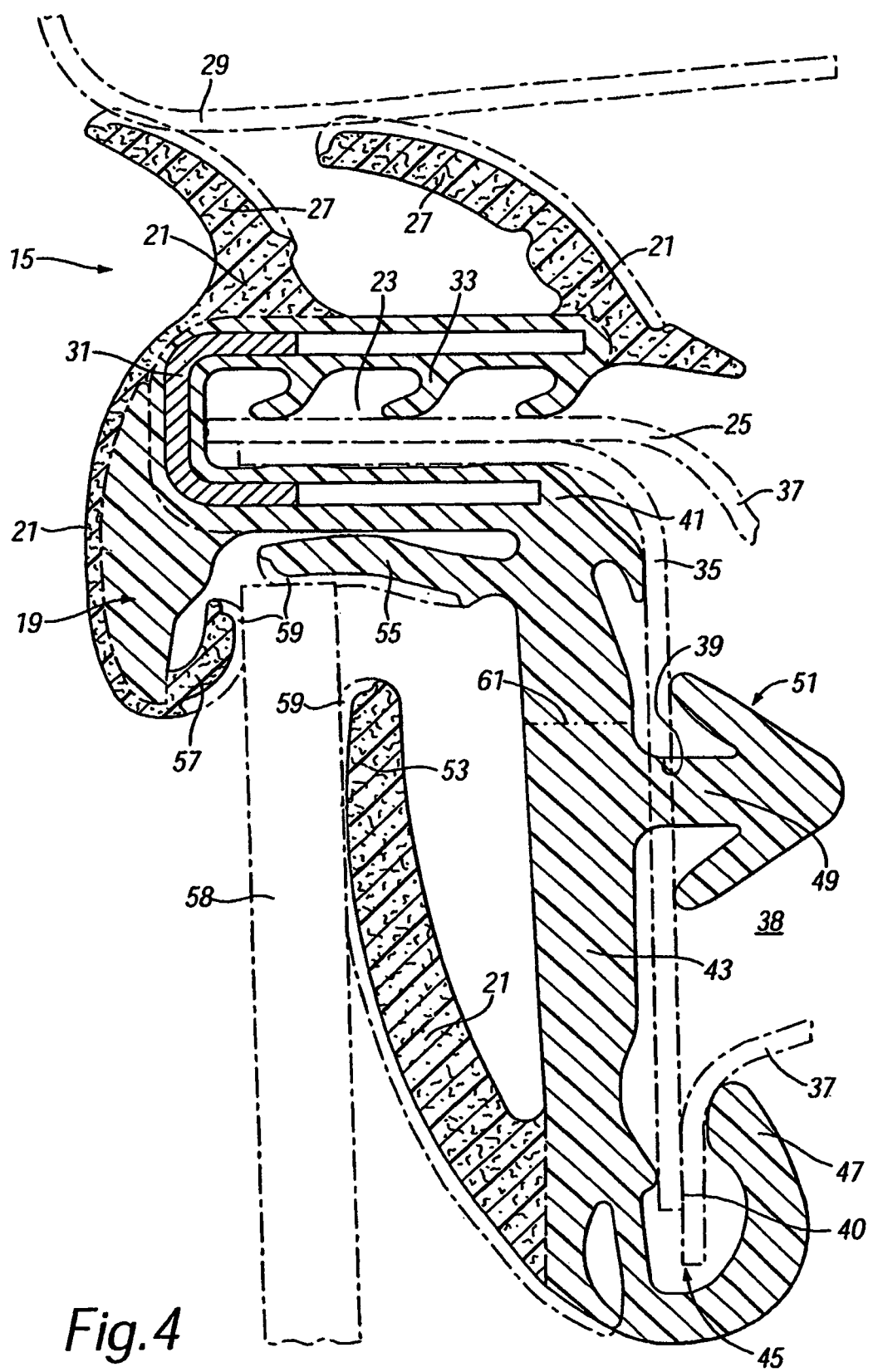
FIG. 4 shows a cross-sectional view taken along the line 4-4 of FIG. 3.

FIG. 4 shows a cross section through the strip 15 at the region above the rear main window 9 (along line 4-4 of FIG. 3). The continuously extruded part 19 forms the outer face of the strip, which is visible from the exterior of the vehicle. The continuously extruded part 19 is formed with regions 21 that are of relatively soft material—as indicated by relatively closely-spaced hatching lines. The inner side of the strip 15 defines a channel 23 which embraces a flange 25 formed by inner and outer panels 35, 37 of the rear door 8 and which defines the frame for the window 9 and the quarter light 11. The uppermost exterior surface of the channel 23 carries integral resiliently deformable lips 27 which press against a bodywork panel 29 defining the opening for the rear door 8. The bodywork 29 extends along the top of the door opening, substantially parallel to the roof of the vehicle 1.

A channel-shaped reinforcing carrier 31 is integrally embedded within the continuously extruded part 19 during the extrusion process. The reinforcing carrier 31 may be made of metal and may be slotted or slitted to improve its flexibility. For example, it may comprise U-shaped elements arranged next to each other to define a channel, the elements being either integrally connected together by short flexible connecting links or perhaps entirely disconnected from each other. Looped wire may be used instead. Other forms of carrier can also be used.

The continuously extruded part 19 is extruded to provide integral resiliently deformable lips 33 within the channel 23 which help to hold the strip securely in position on the flange 25.

The inner and outer panels 35,37 forming the frame of the window are spot-welded (or otherwise attached together) to form the flange 25, then diverge to form a hollow space 38 and come together again to form a further flange 40 where they are again spot-welded (or attached by some other means).

Extended from (and integrally extruded with) the lower side of the channel 23 is a limb 43 which defines a further channel 45 by means of integrally extruded lip 47. The channel 45 accommodates and resiliently embraces the flange 40. The limb 43 is further clamped to the window frame by means of a resiliently deformable protrusion 49 having an enlarged head portion 51 which is pushed through an aperture 39 in the panel 35 and into the hollow space 38. After passing through the aperture 39, the enlarged head portion 51 resiles and presses against the panel 35 around the edges of the aperture 39.

The continuously extruded part 19 of the strip 15 includes an additional lip 41 which engages the panel 35.

The limb 43 carries a lip 53 extending towards a lip 57 formed integrally on the extruded material defining the channel 23. Lips 53 and 57 together form a channel or recess for receiving the edge of the window pane 58 of the window 9. Lip 53 contacts the inside surface of the window pane 58 when the window is closed. Lip 57 contacts the outer surface of the window pane 58. A further lip 55 engages the top edge of the window pane 58. Each of the lips 53,55 and 57 may be provided with a coating of flocked material 59 at the point where they engage the glass 9. The lip 53 will not be visible from the exterior of the vehicle. Its upper part will be obscured by the continuously extruded part 19, and may further be obscured by a black shading applied to the upper part of the window pane 58 when the window is closed.

Figure 5:
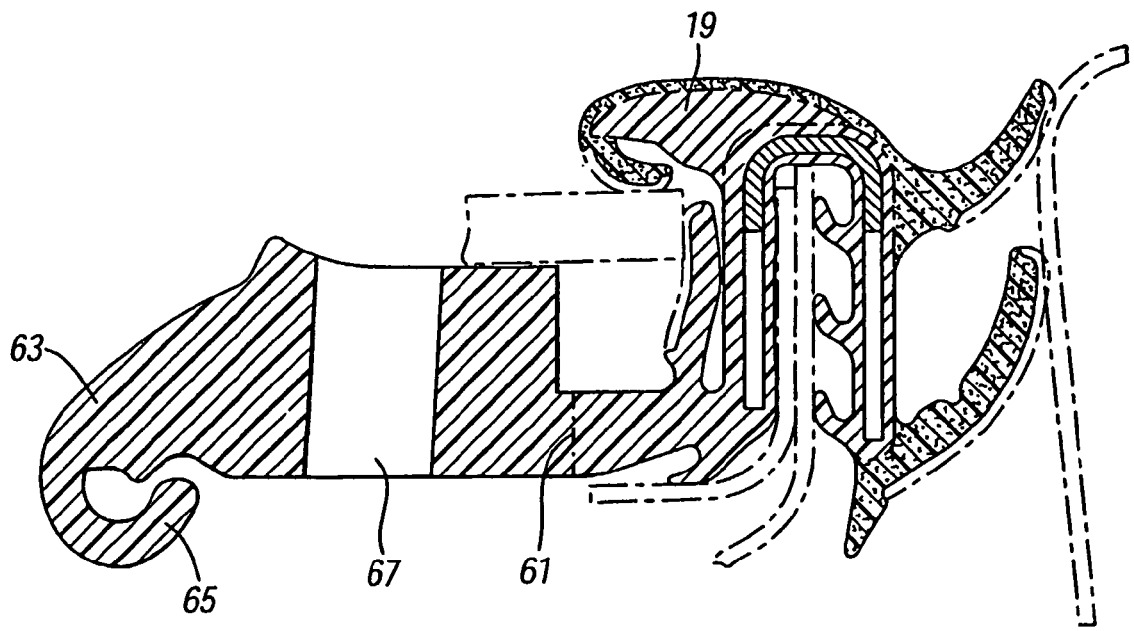
FIG. 5 shows a cross-sectional view taken along the line 5-5 of FIG. 3.
Figure 6:
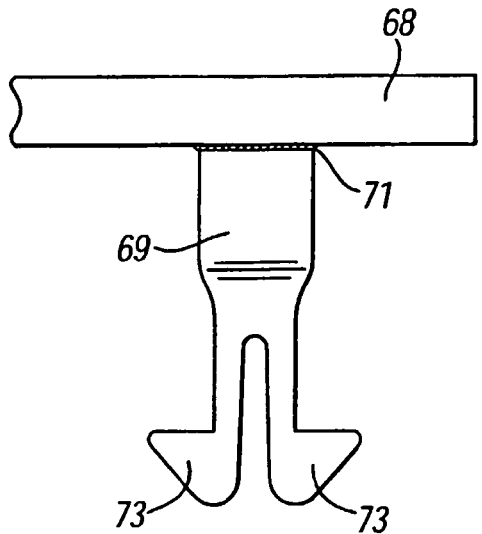
FIG. 6 shows a perspective view of a clip bonded to a pane of glass for co-operation with the structure shown in FIG. 5.
Figure 7:
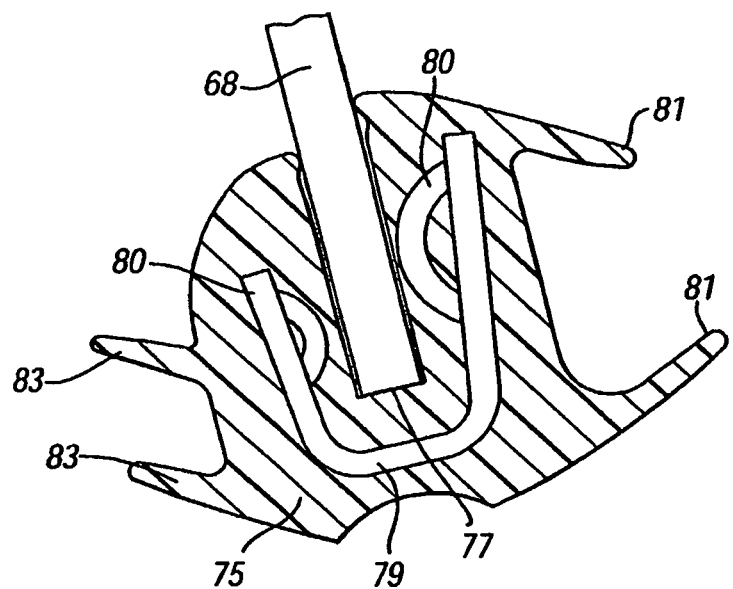
FIG. 7 shows a cross-section taken along the line 7-7 of FIG. 3.

The structure of the strip 15 changes as the strip extends beyond the cross-piece 17 from the main window opening 9 to the quarter light 11. Beyond the cross-piece 17 and extending around the top and rear edge of the quarter light I 1, the strip 15 has the form as shown in FIG. 5. This form is produced by separating the strip structure shown in FIG. 4 along line 61. The material below the line 61 in FIG. 4 is removed and may be discarded. A new strip portion 63 (FIG. 5) is formed by moulding. The strip portion 63 is attached to the continuously extruded part 19 during the moulding process which forms the strip portion 63. In FIG. 5, the structure of the strip to the right of the cut line 61 will not be described further as it is identical to that shown in FIG. 4. The strip portion 63 includes a lip 65 similar to the lip 47 shown in FIG. 4 which receives and embraces the window frame carried by the vehicle door. An aperture 67 is provided in the strip portion 63. FIG. 6 shows the glass pane 68 of the quarter light 11 to which a clip 69 is bonded by means of adhesive 71. The clip 69 passes through the aperture 67 in the strip portion 63 and through a further aperture in the window frame (not shown, but similar to the aperture 39 in FIG. 4). The enlarged head portions 73 of the clip 69 deform inwards as they pass through the apertures, whereafter they resile, clamping the glass 11 to the strip part 63 and to the window frame. The quarter light glass 68 is intended to be fixed into position (i.e. it cannot be opened). The co-operation of the clip 69 with the aperture 67 and with the aperture in the window frame makes it difficult to remove the quarter light glass from the door frame, thereby providing a useful security feature.

Where it meets the waist line of the door, the extruded part 19 terminates and the strip 15 has the form 75 shown in FIG. 7 (cross-section 6-6) along the bottom of the quarter light 11. This strip portion 75 is formed of moulded material, and defines a glass-receiving channel 77. Embedded within the strip portion 75 is a reinforcing carrier 79 having a similar construction to the reinforcing carrier 31 shown in FIG. 4. However, the reinforcing carrier optionally includes arcuate portions 80 pressed out from the reinforcing carrier. Lips 81 and 83 are formed at opposite sides of the strip part 75 each side of the quarter light 11. The lips 81 and 83 engage the internal surfaces of a rigid channel (not shown) running along the waist line of the door.

Figure 8:
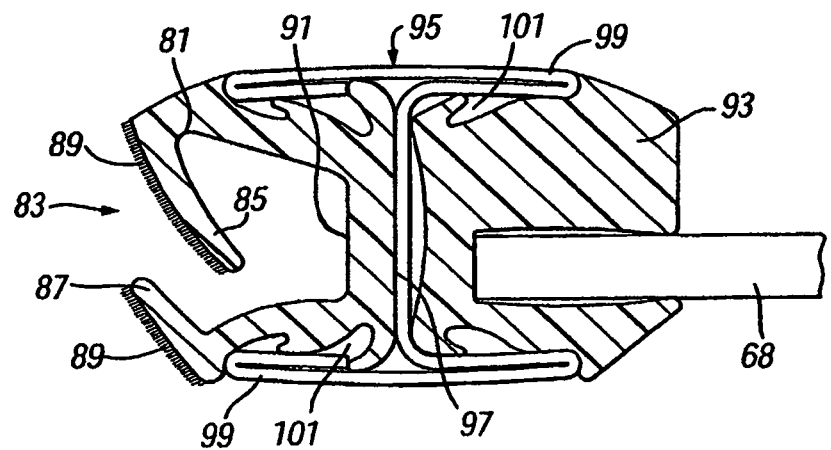
FIG. 8 shows a cross-section taken along the line 8-8 of FIG. 3.

FIG. 8 shows the structure of the strip 15 at the cross-piece 17 (FIG. 2). Along the cross-piece 17, the seal 15 comprises an extruded part 81 including a channel 83 along which the main rear window 9 slides. The mouth of the channel carries an inwardly directed relatively large lip 85 and an outwardly directed relatively small lip 87 which press against the window 9. The surfaces 89 of the lips 85 and 87 which contact the window 9 may be coated with flocked material. Additionally, the base 91 of the channel 83 may also be coated with flocked material.

Along the cross-piece 17, the strip 15 further comprises a channel-shaped moulded part 93 which accommodates the front edge of the quarter light glass 68. The quarter light glass 68 may be fixed with respect to the moulded part 93 by means of adhesive.

The extruded part 81 and the moulded part 93 are accommodated in a rigid division bar 95 of substantially H-shape. The central limb 97 of division bar 95 extends between the extruded part 81 and the moulded part 93. The side pieces 99 of the division bar 95 are accommodated in recesses 101 formed in adjacent portions of the extruded part 81 and the moulded part 93. The division bar 95 is formed by a thin sheet of metal (or other stiff material). In FIG. 8, side pieces 99 are formed by a sheet of material folded over itself to form a double layered structure, with the material then extending to form the central limb 97, such that the division bar 95 is formed from a single sheet of material.

During assembly, the quarter light pane 68 is accommodated in the moulded part 93 before the moulded part 93 and the extruded part 81 are fitted into the division bar 95. This sequence enables the sides of the channel of the part 93 to be opened up to receive the pane 68. The division bar 95 is visible from the interior and exterior of the motor vehicle 1, and is typically coloured black to match the colour of the strip 15.

The division bar 95 is mounted at its lower end into the rigid channel (not shown) running along the waist line of the door. At its upper end the division bar 95 passes through a hole in the window frame and is secured by a screw and clip (none of which is shown).

During manufacture and after cutting the continuously extruded part 19 at the line 61 (FIG. 4) and discarding the lower part of the limb 43, the remaining extruded material 19 is placed in a mould which then moulds onto the extruded material the moulded part 63 shown in FIG. 5, the moulded part 75 shown in FIG. 7 and the moulded part 93 as shown in FIG. 8, the respective extruded and moulded parts being formed as an integral element. Alternatively, the parts 63,75 and 93 could be formed by separate moulding steps or operations.

Figure 9:
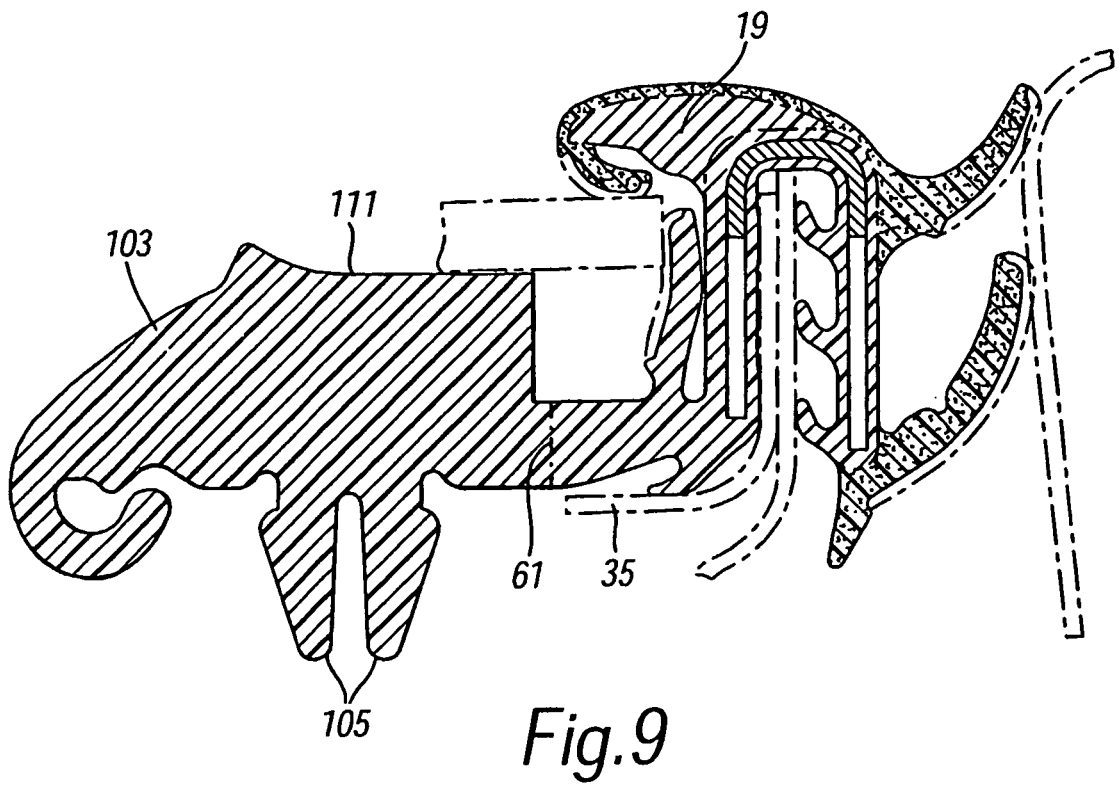
FIG. 9 shows a cross-sectional view of an alternative structure to that shown in FIG. 5.

FIG. 9 shows an alternative configuration for the moulded part 63 of FIG. 5. The alternative part 103 includes integrally moulded clips 105 which pass through an aperture in the window frame and clamp the part 103 to the window frame.

Figure 10:
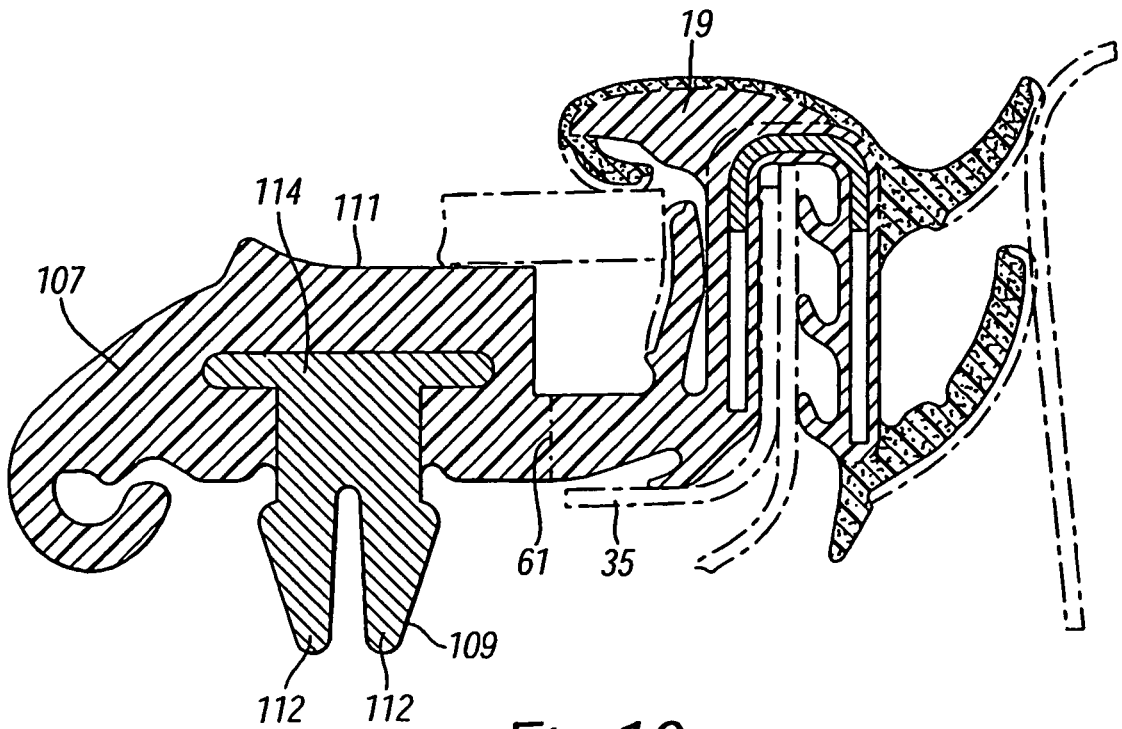
FIG. 10 shows a cross-sectional view of another alternative structure to the structure shown in FIG. 5.

FIG. 10 shows another alternative arrangement, where a moulded part 107 has a clip 109 formed of relatively rigid material embedded within the part 107 during moulding of the part 107. The clip 109 passes through an aperture in the door frame to secure the part 107 thereto. The clip 109 comprises resiliently deformable head portions 112 which clamp the part 107 to the window frame panel 35. The opposite end of the clip 109 comprises a generally planar, substantially circular base portion 114.

Figure 11:
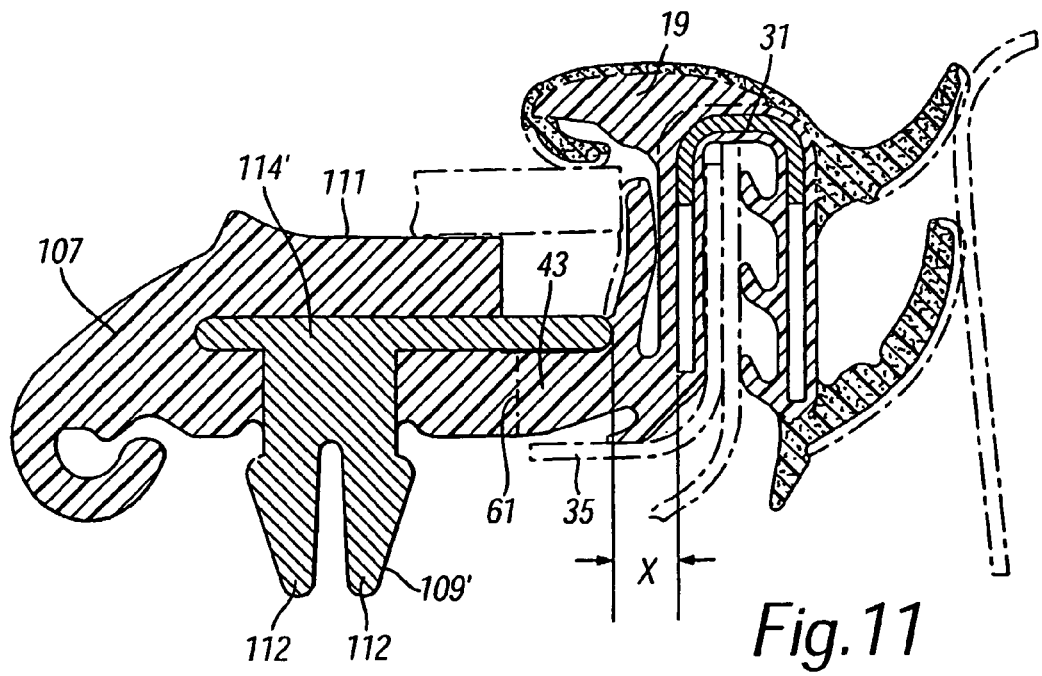
FIG. 11 shows a cross-sectional view of a further alternative structure to the structure shown in FIG. 5.
Figure 12:
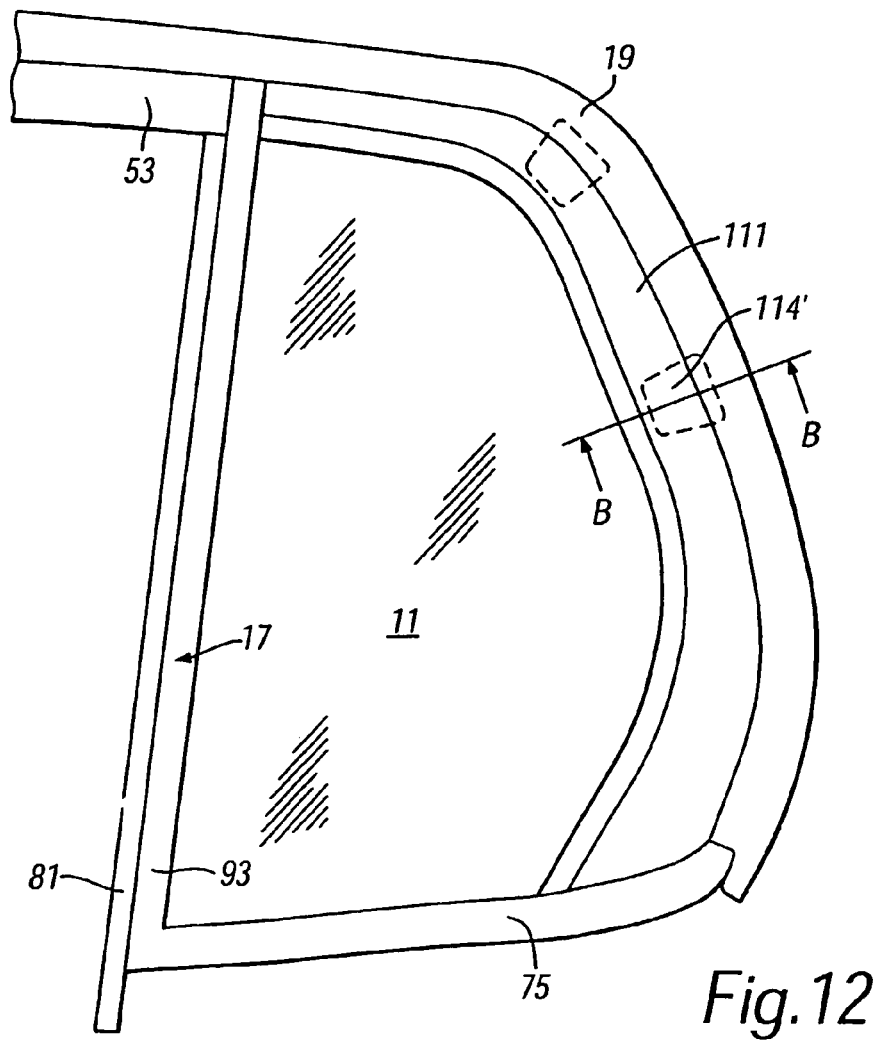
FIG. 12 shows a view in the region of the rear quarter light of a motor vehicle corresponding to the view shown in FIG. 3 but showing the location and orientation of the enlarged base portion of the clip of the FIG. 11 embodiment.

FIG. 11 shows a further alternative arrangement corresponding closely to the arrangement of FIG. 10. However, in the FIG. 11 arrangement the base 114' of the clip 109' is generally planar and substantially trapezium-shaped, as shown by the dashed lines of FIG. 12. The base portion 114' extends outwardly from the moulded part 107 so that it overlies the upper part of the limb 43 of the extruded part 19. The distance "X" between the distal end of the base portion 114' and the outer surface of the reinforcing carrier 31 is reduced by the FIG. 11 modification, and this increases the amount of force, required to detach the seal assembly, comprising the part 107, from the panel 35 (referred to as the "pull-off" force). Advantageously, the pull-off force required may be greater than or equal to 700N. The pull-off force is increased because the extended base portion 114' increases the rigidity of the moulded part 107.

Figure 13:
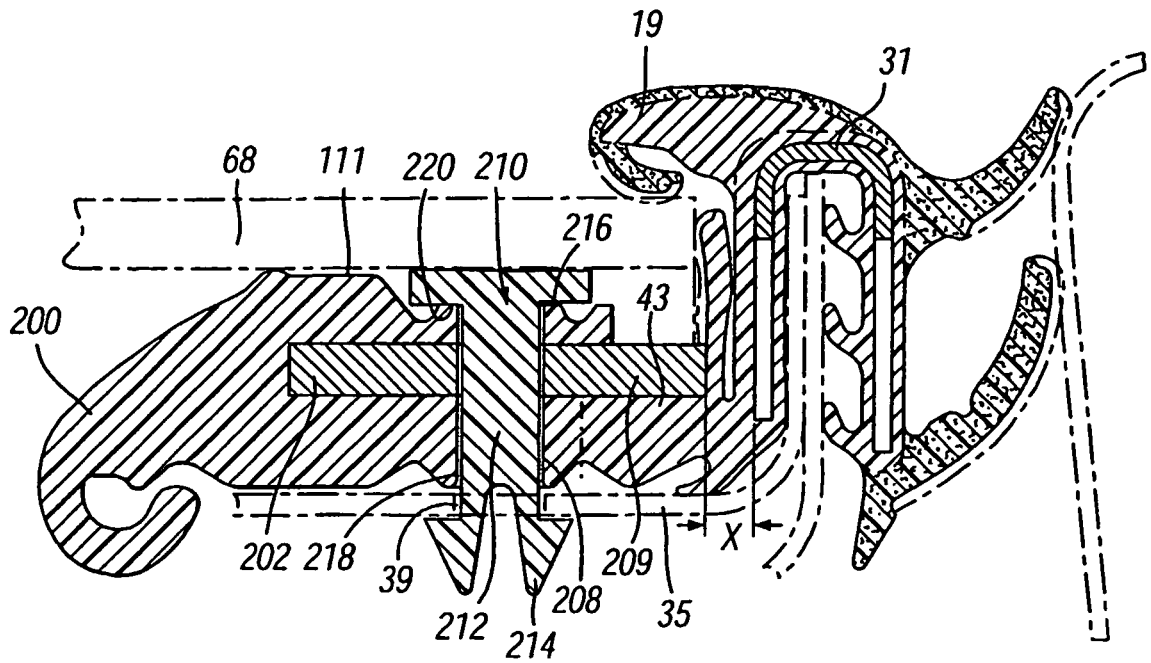
FIG. 13 shows a cross-sectional view of yet a further alternative structure to the structure shown in FIG. 5.

Yet another arrangement of the moulded part (in this embodiment designated 200) is shown in FIG. 13.

The general shape of the moulded part 200 is the same as the moulded parts 63, 103 and 107 of the embodiments described above. However, a generally planar, substantially trapezium-shaped member 202 is embedded within the moulded part 200. The member 202 is relatively rigid. The member 202 is shown in more detail in FIG. 14. The member 202 comprises a relatively large central circular hole 204 formed therein, which is surrounded by seven smaller circular holes 206. The small holes 206 allow the material of the moulded part 200 to pass therethrough to provide improved securing and location of the member 202. The larger hole 204 is positioned to be aligned with a hole 208 formed through the moulded part 200 from the upper surface, adjacent to the window pane 68, to the lower surface, adjacent to the door panel 35. The wider end 209 of the member 202 is positioned to extend from the moulded part 200 and overlie the limb 45 of the extruded part 19, in a similar manner to the FIG. 11 embodiment. The orientation of the member 202 corresponds to the orientation of the base part 114' shown in FIGS. 11 and 12. The distance "X" between the distal end of the member 202 and the outwardly facing surface of the reinforcing carrier 31 is minimised to provide a high pull-off force, as in the FIG. 11 embodiment.

A clip 210 having a cylindrical main body portion 212 sized to be accommodated within the aperture 208 is pushed through the aperture 208 in order to secure the moulded part 200 to the panel 35. Resiliently deformable enlarged head portions 214 clamp the clip 210 to the panel 35 after being pushed through the aperture 39 therein, in cooperation with the enlarged base portion 216 at the opposite end of the clip 210. Lips 218, 220 are formed at the upper and lower surfaces of the moulded part 200 at opposite ends of the aperture 208 which are relatively easily compressible in order to allow for variations in manufacturing tolerances of the door panel 35 and the seal assembly.

Figure 14:
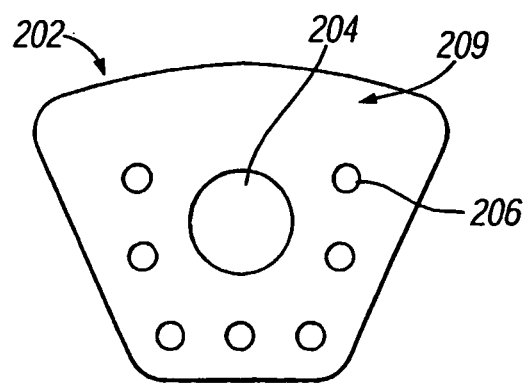
FIG. 14 shows a plan view of a rigid planar member used in the FIG. 13 embodiment.

In a variation to the FIG. 13 and 14 embodiment, a rigid annular insert (not shown) is provided in the aperture 208, such that it acts as a rigid liner, to secure the moulded part 200 more firmly to the panel 35. The annular rigid insert may extend from and be integrally formed with the rigid member 202, or may be separate therefrom.

Figure 15:
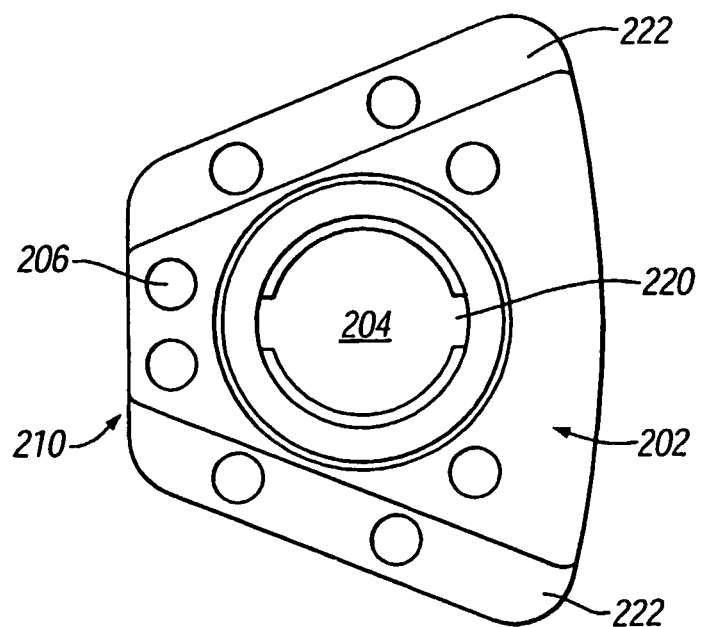
FIG. 15 shows a plan view of an alternative rigid member to that shown in FIG. 14.
Figure 16:
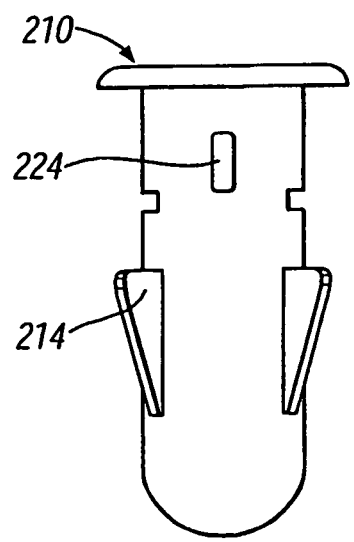
FIG. 16 shows a side elevational view of a clip for use with the rigid member of FIG. 15.

FIGS. 15 and 16 show respectively, in detail, a rigid member 202 and a clip 210 that may be employed in the FIG. 13 and 14 embodiment. The relatively large circular hole 204 in the clip 210 may be provided with two generally rectangular recesses 220 provided at opposite sides of the hole 204. The opposite converging sides of the clip 210 may be provided with chamfered edges 222.

A clip 210 for use with the member 202 is shown in FIG. 16. The clip includes protrusions 224 correspondingly sized and positioned for passing through the recesses 220, whereafter relative rotation between the clip 210 and the member 202 prevents relative longitudinal movement between the clip 210 and the member 202. This is in addition to the clamping provided by the head portions 214, which have a different configuration in FIG. 16 from that shown in FIG. 13, there being no hollow space provided between the head portions 214 in FIG. 16.

If one of the arrangements of FIGS. 9 to 16 is employed, the quarter light glass 68 may advantageously be bonded to the to the surface 111 of the part 103, 107 or 200.

Figure 17:
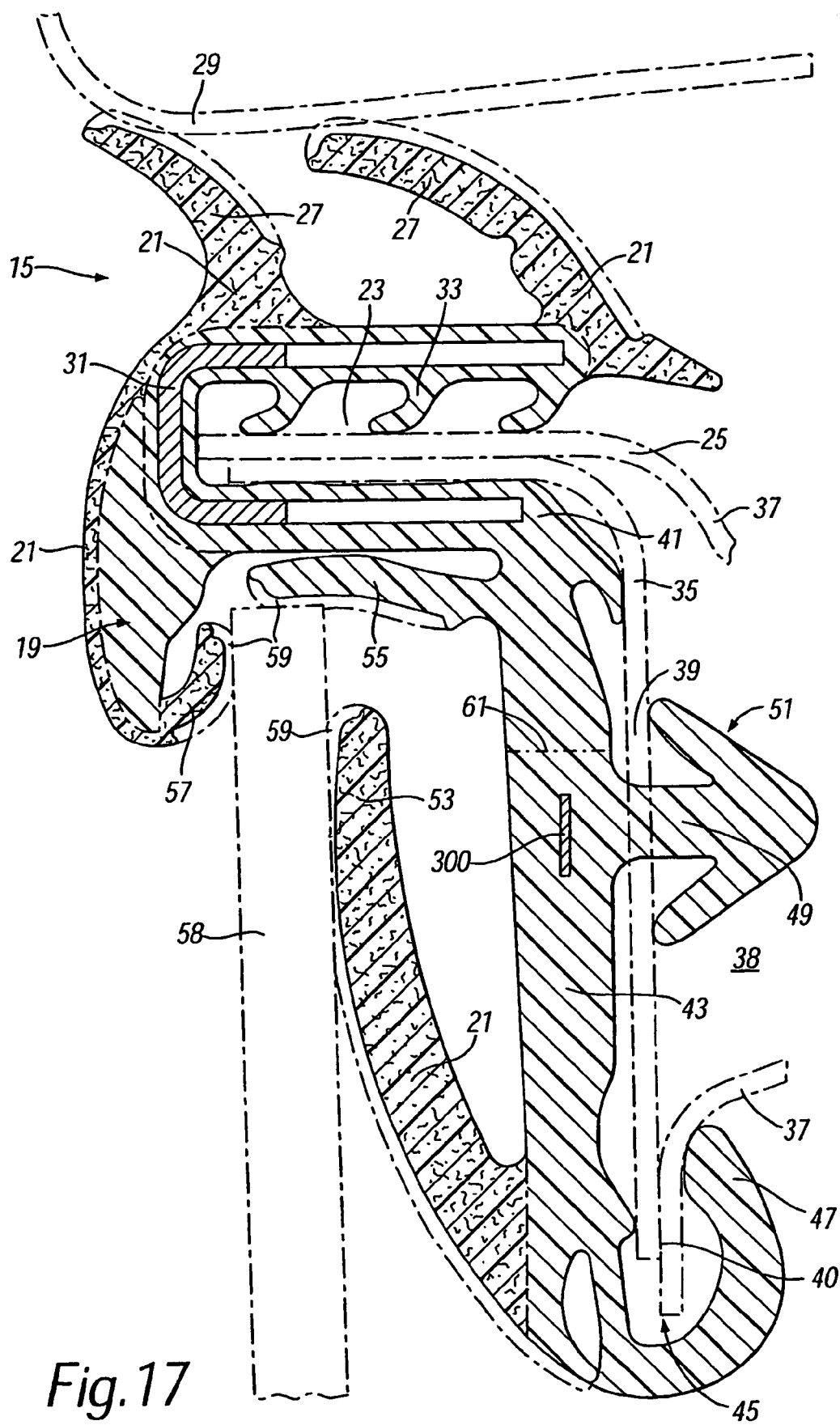
FIG. 17 shows an alternative arrangement of the strip shown in FIG. 4.

FIG. 17 shows a modification to the strip 15 shown in FIG. 4. The structure of the strip 15 in FIG. 17 is the same as that of the strip shown in FIG. 4, with the exception that an additional metal carrier 300 is incorporated in the limb 43, which limb 43 is extruded from (and integrally extruded with) the lower side of the channel 23. The additional metal carrier 300 may, of course comprise materials other than metal. Any suitable rigid material could be employed.

The additional carrier 300 is a planar elongate member which extends into and out of the page of the Figure as shown. The additional carrier 300 is positioned in the region generally above the resiliently deformable protrusion 49, although positioning of the additional carrier 300 at this point is not essential.

The additional carrier 300 increases the longitudinal rigidity of the limb 43.

The additional carrier 300 is integrally embedded within the limb 43 during the extrusion process forming the limb 43 (and other components of the strip 15). The strip 15 will emerge from the extruder as it is formed. The presence of the additional carrier 300, by increasing the longitudinal rigidity, will eliminate or reduce the tendency for the strip 15, and in particular the limb 43, to sag or bend downwards as it emerges from the extruder. This makes it easier to handle the strip 15. For example, it is easy for the strip 15 to be accurately cut to the required size.

The sealing, trimming or guiding strip of the invention is also applicable to the front side window of a vehicle.

The invention claimed is:

1. An assembly for a window frame of a vehicle, said assembly comprising:
   a strip,
   a window pane fixed in position relative to the strip and having an interior side for facing an interior of the vehicle and an exterior side for facing an exterior of the vehicle, and
   the strip including a length of extruded material in contact with the exterior side of the window pane and molded material in contact with the interior side of the window pane and molded onto and connected to the extruded material along only part of the length of the extruded material,
   the extruded material including a channel for receiving a flange of the window frame and a rigid reinforcing carrier embedded within the extruded material in a region of the extruded material corresponding to the channel, the molded material forming a first window pane receiving surface at the interior side of the window pane, the extruded material having a second window pane receiving surface at the exterior side of the window pane and having a generally oppositely facing surface facing opposite the second window pane receiving surface at the interior side of the window pane, and the molded material supporting at least one clip spaced from the extruded material, said at least one clip extending from the molded material in a direction from the exterior side of the window pane toward the interior side of the window pane without extending through the extruded material for securing the molded material to the window frame.

2. The assembly according to claim 1, wherein the molded material forms a closed loop.

3. The assembly according to claim 2, wherein the length of extruded material extends from the closed loop.

4. The assembly according to claim 1, wherein the clip is embedded in the molded material for cooperating with a corresponding formation in the window frame.

5. The assembly according to claim 4, wherein the clip includes a base portion extending towards the channel so as to increase a force required to remove the strip from the window frame.

6. The assembly according to claim 1, wherein the molded material defines an aperture and the clip extends through the aperture.

7. The assembly according to claim 6, wherein the clip is attached to the window pane and the clip passes through the aperture in the molded material for extending through a further aperture in the window frame to secure the window pane to the window frame.

8. The assembly according to claim 6, further comprising a member embedded in the molded material and having an aperture therein through which the clip passes.

9. The assembly according to claim 8, wherein the embedded member extends towards the channel so as to increase a force required to remove the strip from the window frame.

10. The assembly according to claim 1, wherein the clip is integrally formed with the molded material for cooperating with a corresponding formation in the window frame.

11. The assembly according to claim 1, wherein the at least one clip includes a plurality of clips for securing the extruded material to the window frame.

12. The assembly according to claim 1, further comprising an elongate rigid member into which a portion of the strip is fitted.

13. The assembly according to claim 12, wherein the molded material is fitted into the rigid member so as to clamp the window pane fitted in said molded material.

14. The assembly according to claim 12, wherein the rigid member also accommodates a further length of extruded material having a window pane receiving channel.

15. The assembly according to claim 12, wherein the rigid member is substantially H shaped.

16. The assembly according to claim 1, wherein the extruded material includes a limb forming at least a part of a window pane receiving channel.

17. The assembly according to claim 16, wherein the limb has an embedded rigid member therein for reducing a tendency for the limb to bend.

18. The assembly according to claim 1, wherein the extruded material comprises a limb forming at least part of a glass pane receiving channel, and said limb has an embedded member therein for reducing a tendency of the limb to bend.

19. The assembly according to claim 1, wherein the window pain is disposed between the second window pane receiving surface and the oppositely facing surface.

20. A method of forming an assembly for a window frame having a flange the method comprising the steps of: providing: a window pane having an interior side and an exterior side, the method including:

extruding a length of material which forms part of a strip, removing a portion of the extruded material along only part of the length of the extruded material, replacing the portion with molded material which is molded onto and thereby connected to the extruded material to complete the strip, and assembling the strip to the window pane so that the window pane is fixed in position relative to the strip, wherein:

the extruded material includes a channel for receiving the flange of the window frame and a reinforcing carrier embedded within the extruded material in a region of the extruded material corresponding to the channel, the channel remains as part of the strip after removal of said portion of the extruded material, the molded material forms a first window pane receiving surface at the interior side of the window pane, the extruded material has a second window pane receiving surface at the exterior side of the window pane and has a generally oppositely facing surface facing opposite the second window pane receiving surface at the interior side of the window pane, said second window pane receiving surface remaining as part of the strip after removal of said portion of the extruded material, and the molded material supports at least one clip spaced from the extruded material, said at least one clip extending from the molded material in a direction from the exterior side of the window pane toward the interior side of the window pane without extending through the extruded material for securing the molded material to the window frame.

21. The method according to claim 20, wherein the molded material forms a closed loop.

22. The method according to claim 21, wherein the length of extruded material extends from the closed loop.

23. The method according to claim 20, wherein the molded material defines an aperture and the clip extends through the aperture.

24. The method according to claim 23, wherein the clip is attached to the window pane and the clip passes through the aperture in the molded material for extending through a further aperture in the window frame to secure the window pane to the window frame.

25. The method according to claim 23, wherein a member is embedded in the molded material and has an aperture therein through which the clip passes.

26. The method according to claim 25, wherein the embedded member extends towards the channel so as to increase a force required to remove the strip from the window frame.

27. The method according to claim 20, wherein the clip is integrally formed with the molded material for cooperating with a corresponding formation in the window frame.

28. The method according to claim 20, wherein the clip is embedded in the molded material for cooperating with a corresponding formation in the window frame.

29. The method according to claim 28, wherein the clip includes a base portion extending towards the channel so as to increase a force required to remove the strip from the window frame.

30. The method according to claim 20, wherein the at least one clip includes a plurality of clips for securing the strip to the window frame.

31. The method according to claim 20, including a step of providing an elongate member into which a portion of the strip is fitted.

32. The method according to claim 31, wherein the elongate member is substantially H shaped.

33. The method according to claim 31, wherein the elongate member also accommodates a further length of extruded material having a window pane receiving channel.

34. The method according to claim 31, wherein the molded material is fitted into the elongate member so as to clamp the window pane fitted in said molded material.

35. The method according to claim 20, wherein the extruded material includes a limb forming at least a part of a window pane receiving channel, a portion of the limb being removed by removal of said portion of the extruded material.

36. The method according to claim 35, wherein the limb has an embedded member therein for reducing a tendency for the limb to bend.

* * * * *